United States Patent
Sielagoski et al.

(10) Patent No.: US 6,408,241 B1
(45) Date of Patent: *Jun. 18, 2002

(54) METHOD AND SYSTEM FOR CONTROLLING VEHICLE SPEED BASED ON VEHICLE YAW RATE AND YAW ACCELERATION

(75) Inventors: Gerald L. Sielagoski, St. Clair Shores; Mark Peter Friedrich, Clinton Township; Sam G. Rahaim, Ann Arbor, all of MI (US)

(73) Assignee: Visteon Global Technologies, Inc., Dearborn, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 09/954,878

(22) Filed: Sep. 17, 2001

Related U.S. Application Data

(63) Continuation of application No. 09/778,123, filed on Feb. 5, 2001, now Pat. No. 6,317,679.

(51) Int. Cl.[7] .................. B60T 7/12; B60K 31/00; G01S 13/58
(52) U.S. Cl. .................. 701/96; 701/93; 180/170; 303/140; 340/967
(58) Field of Search .............. 701/96, 93, 72, 701/79, 91; 180/170; 303/140, 146; 340/967

(56) References Cited

U.S. PATENT DOCUMENTS

| | | | |
|---|---|---|---|
| 4,998,593 A | | 3/1991 | Karnopp et al. |
| 5,467,283 A | * | 11/1995 | Butsuen et al. .............. 180/169 |
| 5,556,176 A | * | 9/1996 | Bosch et al. ................ 303/147 |
| 5,878,361 A | * | 3/1999 | Sekine et al. ................ 701/208 |
| 5,931,546 A | * | 8/1999 | Nakashima et al. ... 303/122.05 |
| 5,964,822 A | * | 10/1999 | Alland et al. .................. 342/90 |
| 6,070,952 A | * | 6/2000 | Tozu et al. .................. 303/140 |
| 6,112,147 A | * | 8/2000 | Ghoneim et al. ........... 303/146 |
| 6,122,568 A | * | 9/2000 | Madau et al. ................ 180/197 |
| 6,128,569 A | * | 10/2000 | Fukushima .................. 701/72 |
| 6,139,120 A | * | 10/2000 | Fukada ........................ 180/197 |
| 6,141,617 A | * | 10/2000 | Matsuda et al. ............. 340/438 |
| 6,212,465 B1 | * | 3/2001 | Sielagoski et al. |
| 6,317,679 B2 | * | 11/2001 | Sielagoski et al. .......... 180/167 |

* cited by examiner

Primary Examiner—William A. Cuchlinski, Jr.
Assistant Examiner—Olga Hernandez
(74) Attorney, Agent, or Firm—Larry I. Shelton

(57) ABSTRACT

In an adaptive vehicle speed control system, a method and system for controlling the speed of the vehicle while the vehicle is traversing a curved path. The method and system include determining a yaw acceleration of the vehicle, and determining a maximum allowed speed of the vehicle on the curved path based on the yaw acceleration. The method and system also include limiting the speed of the vehicle on the curved path to a value no greater than the maximum allowed vehicle speed.

20 Claims, 3 Drawing Sheets

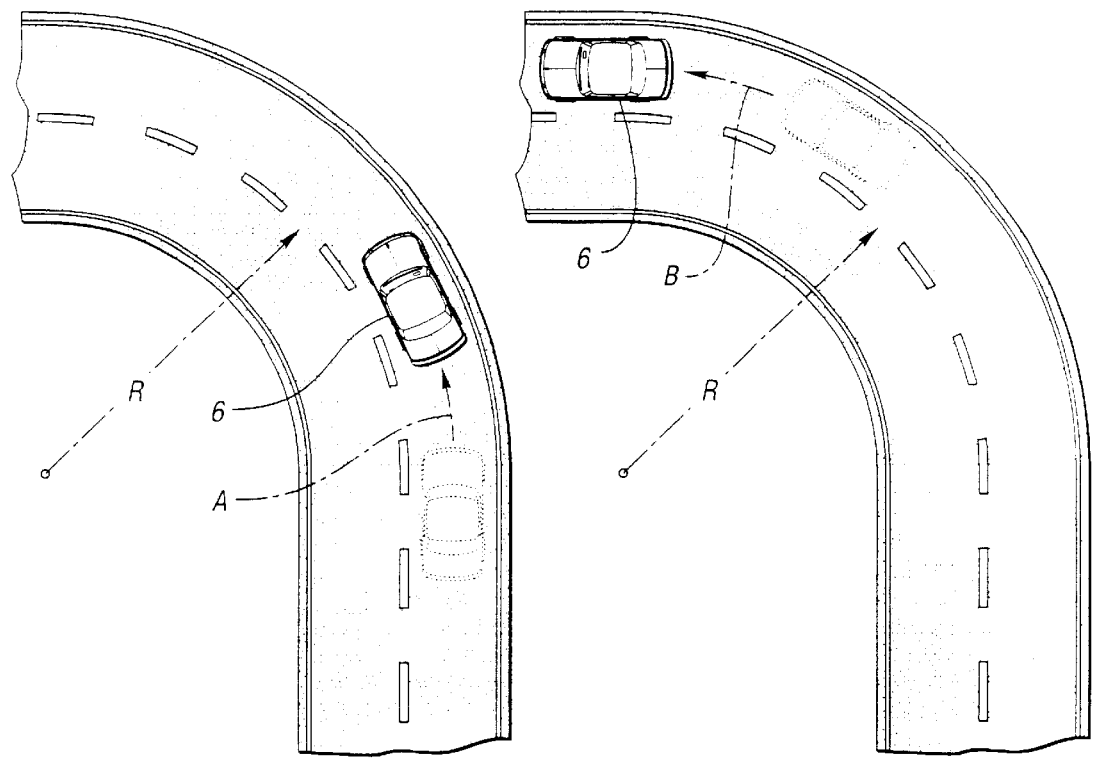
Fig. 1a
(PRIOR ART)
Fig. 1b
(PRIOR ART)
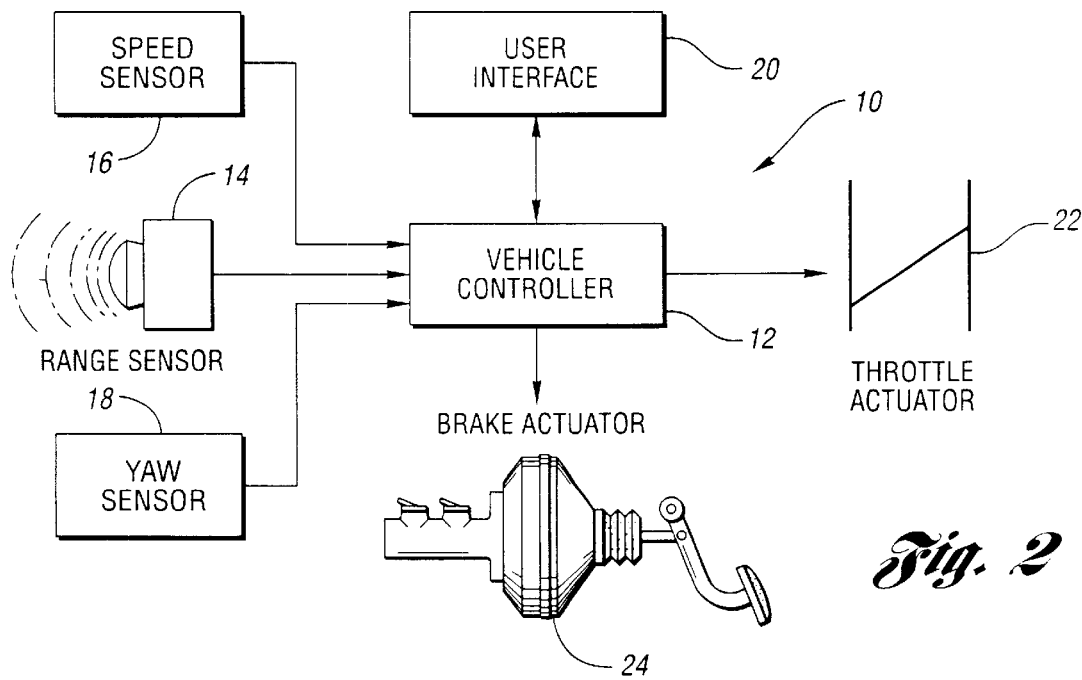
Fig. 2

METHOD AND SYSTEM FOR CONTROLLING VEHICLE SPEED BASED ON VEHICLE YAW RATE AND YAW ACCELERATION

This application is a continuation of U.S. patent application Ser. No. 09/778,123, filed on Feb. 5, 2001, now U.S. Pat. No. 6,317,679.

TECHNICAL FIELD

This invention relates to a method and system, in an adaptive vehicle speed control system, for controlling vehicle speed on a curved path based on the vehicle yaw rate and yaw acceleration.

BACKGROUND ART

Adaptive Cruise (i.e., speed) Control (ACC) systems operate much like conventional Cruise Control systems, with the added capability of being able to sense in-path vehicles and to slow the ACC equipped vehicle in response. An ACC equipped vehicle thereby allows its operator to automatically control the vehicle speed, as with conventional Cruise Control, without the necessity of having to deactivate and reactivate control whenever slower traffic is encountered.

As is well known in the art, existing ACC methods and systems use a forward looking range sensor such as radar to sense an in-path vehicle (which may also be referred to as a sensed target or primary target). Based on the radar sensor information, such ACC methods and systems then determine the range and relative velocity (or range rate) of the sensed in-path vehicle. Using the range and range rate, the speed of the ACC equipped vehicle is controlled to maintain a selected following interval between the ACC equipped vehicle and the sensed in-path vehicle. The speed of the ACC equipped vehicle is typically controlled by automatic control of the vehicle throttle actuator. In more advanced ACC methods and systems, vehicle speed may also be controlled by automatic control of vehicle brake actuators. Such ACC methods and systems have the ability to apply a moderate degree of braking to the vehicle to achieve further vehicle deceleration (i.e., in addition to vehicle deceleration achieved via throttle control) in response to an in-path vehicle.

One problem associated with existing ACC methods and systems, however, occurs when the ACC equipped vehicle is traversing a curved path, such as on an a high-speed expressway. In such situations, existing ACC methods and systems inhibit acceleration of an ACC equipped vehicle based on a sensed vehicle yaw rate and a single, constant yaw rate threshold. In that regard, vehicle yaw rate increases as a vehicle enters a curve, and decreases as a vehicle exits the curve. In an ACC equipped vehicle, for vehicle yaw rates less than a threshold yaw rate, the vehicle speed is limited to a first maximum allowed speed value, considered the control speed or the set speed in normal ACC operation. For vehicle yaw rates greater than the yaw rate threshold, the vehicle speed is limited to a second maximum allowed speed value less than the first maximum allowed speed value. As a result, while an ACC equipped vehicle is traversing a curved path, existing ACC methods and systems may allow or inhibit vehicle acceleration somewhat abruptly, thereby causing possible discomfort to the vehicle operator.

Thus, in an ACC system, there exists a need for an improved method and system for controlling the vehicle speed while the vehicle is traversing a curved path. Such a method and system would sense a vehicle yaw rate, and determine a yaw acceleration based on the yaw rate. Such a method and system would further determine a maximum allowed speed of the vehicle on the curved path based on the yaw rate and the yaw acceleration, and limit the speed of the vehicle on the curved path to a value no greater than the maximum allowed vehicle speed. Such a method and system would thus limit the speed of the ACC equipped vehicle on the curved path to a maximum allowed vehicle speed determined based on not only the sensed vehicle yaw rate, but on yaw acceleration as well, thereby allowing for gradual deceleration of the ACC equipped vehicle as it enters the curve, and gradual acceleration of the ACC equipped vehicle as it exits the curve. In so doing, the speed of the ACC equipped vehicle in a curve would be controlled in a fashion similar to manual control of vehicle speed in a curve, thereby providing improved vehicle operator comfort as the ACC equipped vehicle traverses the curve.

DISCLOSURE OF INVENTION

Accordingly, it is a principal object of the present invention to provide, in an adaptive speed control system for a vehicle, an improved method and system for controlling the vehicle speed while the vehicle is traversing a curved path.

According to the present invention, then, in an adaptive speed control system for a vehicle, a method is provided for controlling a speed of the vehicle while the vehicle is traversing a curved path. The method of the present invention comprises determining a yaw acceleration of the vehicle, and determining a maximum allowed speed of the vehicle on the curved path based on the yaw acceleration. The method further comprises limiting the speed of the vehicle on the curved path to a value no greater than the maximum allowed vehicle speed.

Similarly, the present invention also provides, in an adaptive speed control system for a vehicle, a system for controlling a speed of the vehicle while the vehicle is traversing a curved path. The system comprises means for determining a yaw acceleration of the vehicle, and a controller for determining a maximum allowed speed of the vehicle on the curved path based on the yaw acceleration. The controller of the system of the present invention is further capable of limiting the speed of the vehicle on the curved path to a value no greater than the maximum allowed vehicle speed.

These and other objects, features and advantages of the present invention will be readily apparent upon consideration of the following detailed description of the invention in conjunction with the accompanying drawings.

BRIEF DESCRIPTION OF DRAWINGS

FIGS. 1a and 1b are exemplary illustrations of a vehicle traversing a curved path, including entering and exiting such a path;

FIG. 2 is a simplified block diagram of an adaptive speed control system, including the system of the present invention;

BEST MODE FOR CARRYING OUT THE INVENTION

Figure 3:
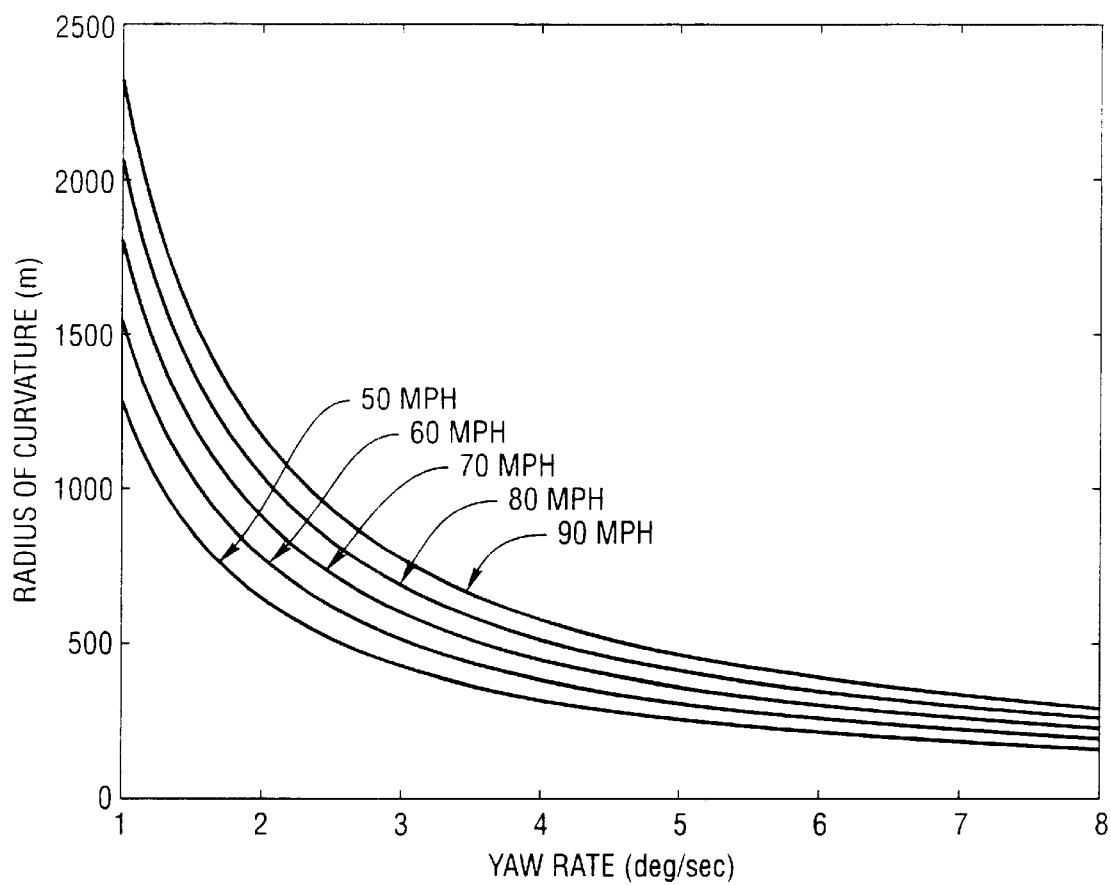
FIG. 3 is a set of exemplary graphs of the radius of curvature of a vehicle path as a function of vehicle speed and vehicle yaw rate.

Referring to FIGS. 1–5, the preferred embodiment of the method and system of the present invention will now be described. In that regard, FIGS. 1a and 1b are exemplary illustrations of a vehicle (6) traversing a curved path, such as on a high-speed expressway. More specifically, FIG. 1a depicts the vehicle (6) entering the curve at point A, while FIG. 1b depicts the vehicle (6) exiting the curve at point B. While the radius of curvature of the curved path varies, a minimum radius of curvature is denoted by R.

As previously noted, a problem is associated with existing Adaptive Cruise Control (ACC) methods and systems where vehicle (6) is an ACC equipped vehicle. In such a situation, existing ACC methods and systems control the speed of the ACC equipped vehicle based on a sensed vehicle yaw rate and a single, constant yaw rate threshold. As a result, existing ACC methods and systems may allow or inhibit vehicle acceleration somewhat abruptly, thereby causing possible discomfort to the vehicle operator.

More specifically, as also previously noted, vehicle yaw rate increases as a vehicle enters a curve, and decreases as a vehicle exits the curve. In an ACC equipped vehicle, for vehicle yaw rates less than a threshold yaw rate, the vehicle speed is limited to a first maximum allowed speed value (i.e., the set speed or the control speed). For vehicle yaw rates greater than the yaw rate threshold, the vehicle speed is limited to a second maximum allowed speed value less than the first maximum allowed speed value.

Referring again to FIGS. 1a and 1b, as an ACC equipped vehicle (6) enters a curve at point A, the vehicle speed is permitted to remain constant or even increase up to the first maximum allowed value as long as the sensed vehicle yaw rate is less than a yaw rate threshold. As a result, the vehicle (6) may actually accelerate into the curve, or the vehicle operator may perceive that the vehicle (6) is accelerating into the curve as the vehicle yaw rate increases even though vehicle speed remains constant. Either case may result may be somewhat uncomfortable for the vehicle operator.

As the ACC equipped vehicle (6) continues through the curve, if the sensed vehicle yaw rate exceeds the yaw rate threshold, the vehicle speed is limited to the lower, second maximum allowed vehicle speed value. If the vehicle speed is then greater than the second maximum allowed vehicle speed, the vehicle speed is reduced, such as by throttle control, brake control, or a combination of both. In that case, the vehicle operator may experience a somewhat abrupt and/or uncomfortable vehicle deceleration.

Finally, as the ACC equipped vehicle (6) exits the curve at point B, the sensed vehicle yaw rate may decrease below the yaw rate threshold. As a result, the vehicle speed is then limited to the higher, first maximum allowed speed value. If the vehicle speed is then less than the first maximum allowed vehicle speed, the vehicle speed may be increased. In that case, the vehicle operator may experience a somewhat abrupt and/or uncomfortable vehicle acceleration.

The present invention solves this problem, providing an improved method and system for controlling the vehicle speed while the vehicle is traversing a curved path. In that regard, the present invention senses a vehicle yaw rate and determines a yaw acceleration based on the yaw rate. The present invention also determines a maximum allowed speed of the vehicle (6) on the curved path based on the yaw rate and the yaw acceleration, wherein the maximum allowed vehicle speed is capable of varying continuously. The present invention then limits the speed of the vehicle (6) on the curved path to a value no greater than the maximum allowed vehicle speed. The present invention thus limits the speed of the ACC equipped vehicle (6) on the curved path to a maximum allowed vehicle speed which is determined based on not only the sensed vehicle yaw rate, but on yaw acceleration as well, thereby allowing for gradual deceleration of the ACC equipped vehicle (6) as it enters the curve at point A, and gradual acceleration of the ACC equipped vehicle (6) as it exits the curve at point B. In so doing, the present invention controls the speed of the ACC equipped vehicle (6) in a curve in a fashion similar to manual control of vehicle speed in a curve, thereby providing improved vehicle operator comfort as the ACC equipped vehicle (6) traverses the curve.

Referring now to FIG. 2, a simplified block diagram of an ACC system is shown, including the system of the present invention, denoted generally by reference numeral 10. In general, as is well known to those of ordinary skill in the art, ACC system (10) is a closed loop control system intended to respond to potential targets in front of and in the same lane of traffic as the vehicle equipped with the ACC system (10). The goal of ACC system (10) is to partially automate the continuous longitudinal control of the vehicle, thereby providing the vehicle operator with improved comfort and convenience. In that regard, ACC system (10) may operate in either a normal or a following mode. In normal mode operation, ACC system (10) controls the speed of the ACC equipped vehicle to the speed set by the vehicle operator as the control speed. In following mode operation, ACC system (10) controls the speed of the ACC equipped vehicle to the speed of a sensed in-path vehicle (which may be referred to as a sensed target or a primary target).

More specifically, as seen in FIG. 2, the ACC system (10) includes a vehicle controller (12) provided in communication with a range sensor (14), a speed sensor (16), a yaw rate sensor (18), a user interface (20), a throttle actuator (22), and a brake actuator (24). As previously described, the system (10) extends the function of conventional speed control systems. In that regard, based on range and relative velocity information obtained and/or derived from forward looking range sensor (14) and speed sensor (16), vehicle controller (12) uses throttle and brake actuators (22, 24) to control the speed of the ACC equipped vehicle in order to maintain a selected following interval (in seconds) between the ACC equipped vehicle and a sensed target in the forward path of travel of the ACC equipped vehicle (i.e., a lead vehicle).

The following interval between the ACC equipped vehicle and the sensed target is initially set at a default value (typically two seconds) upon activation of the system (10), but may be modified by the vehicle operator to a number of other selectable values via user interface (20). The default following interval is typically the maximum following interval allowed, and modification of the following interval by the vehicle operator is permitted between that maximum and a defined minimum following interval (typically one second). The following interval is referred to as headway, and is defined as the range to the sensed target (in meters), divided by the speed of the ACC equipped vehicle (in meters per second). User interface (20) is also used by the vehicle operator to set the allowed vehicle control speed.

As previously noted, ACC systems and methods are well known in the art. As a result, a detailed description of the general operation of ACC system (10), including such functions as acquisition, discrimination, differentiation, selection and tracking of targets, range and relative velocity (including range rate) determinations, sensor operations, and throttle and brake control is unnecessary and, for the sake of brevity, is not set forth herein. In connection with the method and system of the present invention, such functions of ACC system (10) may be undertaken in any fashion known to those of ordinary skill.

The present invention solves the problem noted above, providing an improved method and system, in an ACC system, for controlling vehicle speed as the vehicle traverses a curved path. Referring still to FIG. 2, the system of the present invention includes yaw rate sensor (18), which is capable of sensing an instantaneous yaw rate of the vehicle. The system further includes a controller capable of determining an instantaneous yaw acceleration based on the sensed yaw rate, and capable of determining a maximum allowed speed of the vehicle on the curved path based on the yaw rate and the yaw acceleration. In that regard, the maximum allowed vehicle speed so determined is capable of varying continuously depending on the instantaneous values of the vehicle yaw rate sensed and the yaw acceleration determined. The controller is also capable of limiting the speed of the vehicle on the curved path to a value no greater than the maximum allowed vehicle speed. The controller of the system of the present invention is preferably included in vehicle controller (12). In that regard, the controller of the present invention (as well as vehicle controller (12) of ACC system (10)) may take the form of an appropriately programmed microprocessor, or any equivalent thereof.

More specifically, to determine a maximum allowed speed of the vehicle, the controller of the system of the present invention is capable of determining a relative position of the vehicle on the curved path based on the vehicle yaw rate and yaw acceleration. To do so, the controller is capable of examining the sensed vehicle yaw rate and the yaw acceleration determined therefrom, and determining that the vehicle is entering the curved path when the yaw acceleration is positive (i.e., when the sensed yaw rate is increasing over time), and that the vehicle is exiting the curved path when the yaw acceleration is negative (i.e., when the sensed yaw rate is decreasing over time).

The controller is also capable of selecting a desired lateral acceleration of the vehicle based on the relative position of the vehicle on the curved path. More particularly, a lateral acceleration profile may be empirically defined based on the relative position of the vehicle traversing a curve and vehicle operator comfort. In that regard, at generally higher vehicle speeds such as those typically experienced on high-speed expressways, lateral acceleration of the vehicle while traversing a curve should generally be limited to 0.3 g or less. As a vehicle enters a curve, to improve operator comfort, lateral acceleration should generally be limited to lower levels, such as 0.1 g or 0.15 g. As a vehicle exits a curve, lateral acceleration may be permitted to generally increase, such as to 0.2 g, 0.25 g, or 0.3 g levels. Such lateral acceleration levels based on the relative position of the vehicle in a curve are similar to those that may be experienced by a vehicle operator manually controlling vehicle speed as the vehicle traverses a curve. Thus, to select a desired lateral acceleration of the vehicle, the controller of the system of the present invention is capable of selecting a first lateral acceleration value when the vehicle is entering the curved path, and selecting a second lateral acceleration value when the vehicle is exiting the curved path, where the first lateral acceleration value is less than the second lateral acceleration value.

Still further, to determine a maximum allowed vehicle speed, the controller of the system of the present invention is also capable of determining a radius of curvature of the curved path based on the yaw rate and a sensed vehicle speed. In that regard, FIG. 3 is a set of exemplary graphs of radii of curvature of vehicle paths as a function of vehicle speed and yaw rate. As seen therein, for a given vehicle speed, the radius of curvature is generally lower (representing tighter curves) the greater the yaw rate. According to the present invention, to determine a radius of curvature of the curved path of the vehicle, the controller is capable of calculating a radius of curvature according to the equation:

$$R = \text{VEHSPD}/\text{YAWRATE}$$

where R is the radius of curvature of the curved path, VEHSPD is the speed of the vehicle from speed sensor (16), and YAWRATE is the yaw rate of the vehicle from yaw sensor (18).

Figure 4:
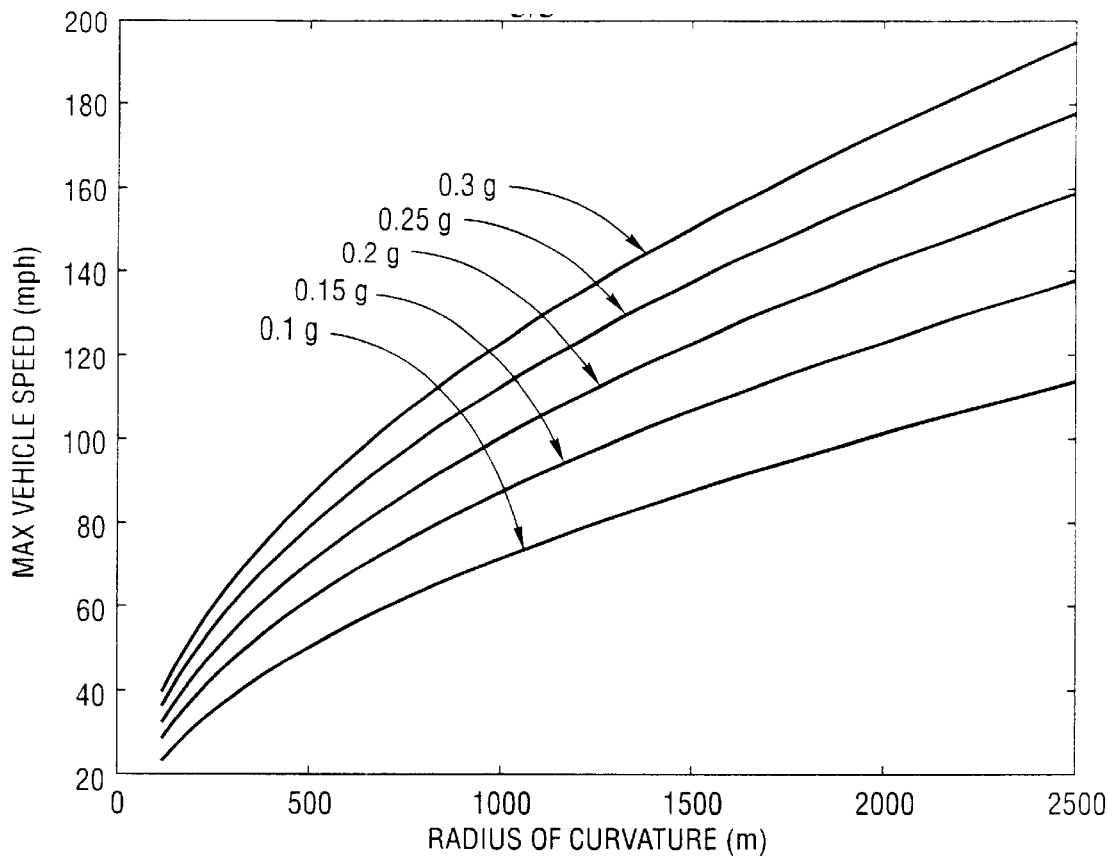
FIG. 4 is a set of exemplary graphs of a maximum vehicle speed as a function of vehicle lateral acceleration and the radius of curvature of a vehicle path.

The controller of the system of the present invention is still further capable of determining a maximum allowed speed of the vehicle based on the radius of curvature of the curved path and the selected vehicle lateral acceleration. In that regard, FIG. 4 shows a set of graphs of maximum allowed vehicle speeds as a function of the radius of curvature of the curved vehicle path and vehicle lateral acceleration. As seen therein, for a selected lateral acceleration, the greater the radius of curvature (i.e., the tighter the curve), the lower the maximum allowed vehicle speed. According to the present invention, the controller of the system is capable of calculating a maximum allowed speed of the vehicle according to the equation:

$$\text{MAXVS} = (R \times \text{LATACCEL})^{1/2}$$

where MAXVS is the maximum allowed vehicle speed, R is the radius of curvature of the curved path determined as shown above, and LATACCEL is the lateral acceleration of the vehicle selected as described above.

Finally, to limit the speed of the vehicle on the curved path to a value no greater than the maximum allowed vehicle speed, in the event the vehicle speed is less than the maximum allowed vehicle speed, the controller is capable of limiting a commanded throttle position to a value no greater than a selected throttle position value corresponding to the maximum allowed vehicle speed. In the event the vehicle speed exceeds the maximum allowed vehicle speed, the controller is capable of reducing the vehicle speed to the maximum allowed vehicle speed by generating a throttle control signal operative to control a throttle actuator, generating a brake control signal operative to control a brake actuator, or a combination of both. In that regard, throttle and brake actuators (22, 24) are shown in FIG. 2, and the throttle control described herein uses a steady-state mapping of throttle commands and associated vehicle speeds.

Figure 5:
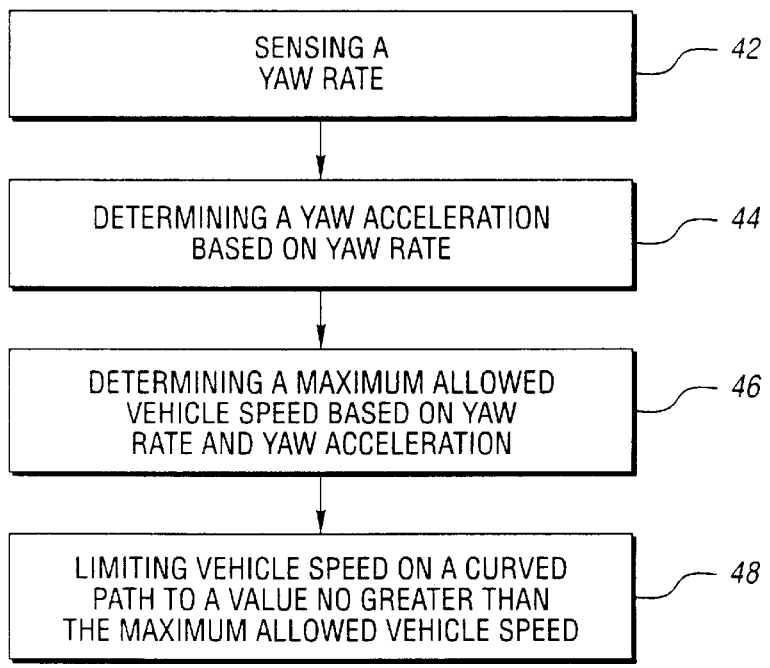
FIG. 5 is a flowchart including the method of the present invention.

Referring now to FIG. 5, a flowchart including the method of the present invention is shown, denoted generally by reference numeral 40. As seen therein, in an adaptive speed control system for a vehicle, the method of the present invention for controlling a vehicle speed while the vehicle is traversing a curved path comprises sensing (42) a yaw rate of the vehicle, determining (44) a yaw acceleration based on the yaw rate, and determining (46) a maximum allowed speed of the vehicle on the curved path based on the yaw rate and the yaw acceleration, wherein the maximum allowed speed is capable of varying continuously. The method further comprises limiting (48) the speed of the vehicle on the curved path to a value no greater than the maximum allowed vehicle speed.

Just as described in detail above in connection with the system of the present invention, according to the method of the present invention, determining (46) a maximum allowed speed of the vehicle itself comprises determining a relative position of the vehicle on the curved path based on the yaw acceleration, selecting a desired lateral acceleration of the vehicle based on the relative position of the vehicle on the curved path, determining a radius of curvature of the curved path based on the yaw rate and a sensed vehicle speed, and determining a maximum allowed speed of the vehicle based on the radius of curvature of the curved path and the selected vehicle lateral acceleration.

In that regard, determining a relative position of the vehicle on the curved path itself comprises determining that the vehicle is entering the curved path when the yaw acceleration is positive, and determining that the vehicle is exiting the curved path when the yaw acceleration is negative. Selecting a desired lateral acceleration of the vehicle itself comprises selecting a first lateral acceleration value when the vehicle is entering the curved path, and selecting a second lateral acceleration value when the vehicle is exiting the curved path, wherein the first lateral acceleration value is less than the second lateral acceleration value.

As also describe above in detail in connection with the system of the present invention, according to the method of the present invention, determining a radius of curvature of the curved path comprises calculating a radius of curvature according to the equation:

$$R = \text{VEHSPD/YAWRATE}$$

where R is the radius of curvature of the curved path, VEHSPD is a sensed speed of the vehicle, and YAWRATE is the sensed yaw rate of the vehicle. In addition, determining a maximum allowed speed of the vehicle based on the radius of curvature of the curved path and the selected vehicle lateral acceleration comprises calculating a maximum allowed speed of the vehicle according to the equation:

$$\text{MAXVS} = (R \times \text{LATACCEL})^{1/12}$$

where MAXVS is the maximum allowed vehicle speed, R is the radius of curvature of the curved path, and LATACCEL is the selected lateral acceleration of the vehicle.

Finally, limiting (48) the speed of the vehicle on the curved path to a value no greater than the maximum allowed vehicle speed may comprise generating a throttle control signal operative to control a throttle actuator to reduce the vehicle speed when the vehicle speed exceeds the maximum allowed vehicle speed, generating a brake control signal operative to control a brake actuator to reduce the vehicle speed when the vehicle speed exceeds the maximum allowed vehicle speed, or a combination of both. Limiting (48) the speed of the vehicle on the curved path to a value no greater than the maximum allowed vehicle speed may also comprise limiting a commanded throttle position to a value no greater than a selected throttle position value. Once again, throttle and brake actuators (22, 24) are shown in FIG. 2, and the throttle control described herein uses a steady-state mapping of throttle commands and associated vehicle speeds.

As previously described, and as readily apparent from the foregoing description, as a vehicle enters a curve, vehicle yaw rate increases and the radius of curvature of the curve decreases. As a vehicle exits a curve, vehicle yaw rate decreases and the radius of curvature increases. As is also readily apparent from the foregoing description, according the present invention, the maximum allowed vehicle speed as the vehicle enters a curve may be less than the maximum allowed vehicle speed as the vehicle exits the curve.

Moreover, the maximum allowed vehicle speed is capable of varying continuously as the vehicle traverses the curve. In such a fashion, the present invention represents an improved method and system for controlling the vehicle speed while the vehicle is traversing a curved path. That is, rather than allowing or inhibiting vehicle acceleration somewhat abruptly as in existing ACC methods and systems, the present invention allows for gradual deceleration of the ACC equipped vehicle as it enters the curve, and gradual acceleration of the ACC equipped vehicle as it exits the curve. The speed of the ACC equipped vehicle in a curve is thus controlled in a fashion similar to manual control of vehicle speed in a curve, thereby providing improved vehicle operator comfort.

While various embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. In an adaptive speed control system for a vehicle, a method for controlling a speed of the vehicle while the vehicle is traversing a curved path, the method comprising:
   determining a yaw acceleration of the vehicle;
   determining a maximum allowed speed of the vehicle on the curved path based on the yaw acceleration; and
   limiting the speed of the vehicle on the curved path to a value no greater than the maximum allowed vehicle speed.

2. The method of claim 1 wherein determining a yaw acceleration includes determining a yaw rate of the vehicle.

3. The method of claim 1 wherein determining a maximum allowed speed of the vehicle comprises:
   determining a relative position of the vehicle on the curved path based on the yaw acceleration;
   selecting a desired lateral acceleration of the vehicle based on the relative position of the vehicle on the curved path;
   determining a radius of curvature of the curved path based on a yaw rate of the vehicle and a sensed vehicle speed; and
   determining a maximum allowed speed of the vehicle based on the radius of curvature of the curved path and the selected vehicle lateral acceleration.

4. The method of claim 3 wherein determining a relative position of the vehicle on the curved path comprises:
   determining that the vehicle is entering the curved path when the yaw acceleration is positive; and
   determining that the vehicle is exiting the curved path when the yaw acceleration is negative.

5. The method of claim 4 wherein selecting a desired lateral acceleration of the vehicle comprises:
   selecting a first lateral acceleration value when the vehicle is entering the curved path; and
   selecting a second lateral acceleration value when the vehicle is exiting the curved path, wherein the first lateral acceleration value is less than the second lateral acceleration value.

6. The method of claim 3 wherein determining a radius of curvature of the curved path comprises calculating a radius of curvature according to the equation:

$$R = \text{VEHSPD/YAWRATE}$$

where R is the radius of curvature of the curved path, VEHSPD is a sensed speed of the vehicle, and YAWRATE is the yaw rate of the vehicle.

7. The method of claim 3 wherein determining a maximum allowed speed of the vehicle based on the radius of curvature of the curved path and the selected vehicle lateral acceleration comprises calculating a maximum allowed speed of the vehicle according to the equation:

$$MAXVS = (R \times LATACCEL)^{1/2}$$

where MAXVS is the maximum allowed vehicle speed, R is the radius of curvature of the curved path, and LATACCEL is the selected lateral acceleration of the vehicle.

8. The method of claim 1 wherein limiting the speed of the vehicle on the curved path to a value no greater than the maximum allowed vehicle speed comprises generating a throttle control signal operative to control a throttle actuator to reduce the vehicle speed when the vehicle speed exceeds the maximum allowed vehicle speed.

9. The method of claim 1 wherein limiting the speed of the vehicle on the curved path to a value no greater than the maximum allowed vehicle speed comprises generating a brake control signal operative to control a brake actuator to reduce the vehicle speed when the vehicle speed exceeds the maximum allowed vehicle speed.

10. The method of claim 1 wherein limiting the speed of the vehicle on the curved path to a value no greater than the maximum allowed vehicle speed comprises limiting a commanded throttle position to a value no greater than a selected throttle position value.

11. In an adaptive speed control system for a vehicle, a system for controlling a speed of the vehicle while the vehicle is traversing a curved path, the system comprising:

means for determining a yaw acceleration of the vehicle; and a controller for determining a maximum allowed speed of the vehicle on the curved path based on the yaw acceleration, and limiting the speed of the vehicle on the curved path to a value no greater than the maximum allowed vehicle speed.

12. The system of claim 11 wherein the means for determining a yaw acceleration of the vehicle includes means for determining a yaw rate of the vehicle and means for determining a yaw acceleration of the vehicle based on the yaw rate determined.

13. The system of claim 11 wherein, to determine a maximum allowed speed of the vehicle, the controller is further for determining a relative position of the vehicle on the curved path based on the yaw acceleration, selecting a desired lateral acceleration of the vehicle based on the relative position of the vehicle on the curved path, determining a radius of curvature of the curved path based on a yaw rate of the vehicle and a sensed vehicle speed, and determining a maximum allowed speed of the vehicle based on the radius of curvature of the curved path and the selected vehicle lateral acceleration.

14. The system of claim 13 wherein, to determine a relative position of the vehicle on the curved path, the controller is further for determining that the vehicle is entering the curved path when the yaw acceleration is positive, and determining that the vehicle is exiting the curved path when the yaw acceleration is negative.

15. The system of claim 14 wherein, to select a desired lateral acceleration of the vehicle, the controller is further for selecting a first lateral acceleration value when the vehicle is entering the curved path, and selecting a second lateral acceleration value when the vehicle is exiting the curved path, wherein the first lateral acceleration value is less than the second lateral acceleration value.

16. The system of claim 13 wherein, to determine a radius of curvature of the curved path, the controller is further for calculating a radius of curvature according to the equation:

$$R = VEHSPD/YAWRATE$$

where R is the radius of curvature of the curved path, VEHSPD is a sensed speed of the vehicle, and YAWRATE is the yaw rate of the vehicle.

17. The system of claim 13 wherein, to determine a maximum allowed speed of the vehicle based on the radius of curvature of the curved path and the selected vehicle lateral acceleration, the controller is further for calculating a maximum allowed speed of the vehicle according to the equation:

$$MAXVS = (R \times LATACCEL)^{1/12}$$

where MAXVS is the maximum allowed vehicle speed, R is the radius of curvature of the curved path, and LATACCEL is the selected lateral acceleration of the vehicle.

18. The system of claim 11 wherein, to limit the speed of the vehicle on the curved path to a value no greater than the maximum allowed vehicle speed, the controller is further for generating a throttle control signal operative to control a throttle actuator to reduce the vehicle speed when the vehicle speed exceeds the maximum allowed vehicle speed.

19. The system of claim 11 wherein, to limit the speed of the vehicle on the curved path to a value no greater than the maximum allowed vehicle speed, the controller is further for generating a brake control signal operative to control a brake actuator to reduce the vehicle speed when the vehicle speed exceeds the maximum allowed vehicle speed.

20. The system of claim 11 wherein, to limit the speed of the vehicle on the curved path to a value no greater than the maximum allowed vehicle speed, the controller is further for limiting a commanded throttle position to a value no greater than a selected throttle position value.

* * * * *